United States Patent [19]

Cho et al.

[11] Patent Number: 5,674,941
[45] Date of Patent: Oct. 7, 1997

[54] ANTIFOGGING ABRASION RESISTANT COATING COMPOSITION AND SYNTHETIC RESIN ARTICLE COATED THEREWITH

[75] Inventors: Yong-Il Cho; Sung-Hoon Jang; Jung-Ok Park, all of Daejeon, Rep. of Korea

[73] Assignee: Lucky Limited, Seoul, Rep. of Korea

[21] Appl. No.: 335,002

[22] Filed: Apr. 15, 1994

[30] Foreign Application Priority Data

Apr. 16, 1993 [KR] Rep. of Korea ................ 93-6425

[51] Int. Cl.$^6$ ................ C09D 4/00; C09D 143/04; C09D 4/06

[52] U.S. Cl. ................ 525/102; 528/26; 528/24; 528/23; 528/18; 528/17; 528/16; 528/14; 528/13; 528/12; 525/103

[58] Field of Search ................ 528/102, 103, 528/26, 24, 23, 18, 17, 16, 14, 12

[56] References Cited

U.S. PATENT DOCUMENTS

| | | |
|---|---|---|
| 4,098,840 | 7/1978 | Yoshida et al. |
| 4,243,767 | 1/1981 | Kaufman et al. ............ 525/102 |
| 4,348,462 | 9/1982 | Chung ............ 428/412 |
| 4,522,966 | 6/1985 | Funaki et al. |
| 4,603,086 | 7/1986 | Fujii et al. ............ 428/447 |

FOREIGN PATENT DOCUMENTS

| | | |
|---|---|---|
| 0281365 | 1/1988 | European Pat. Off. |
| 0424007 | 9/1990 | European Pat. Off. |

OTHER PUBLICATIONS

Week 7943, Derwent Publications Ltd., London, GN; AN 79–78355B and JP-A-54 119 599 (Japan Atomic Energy Res.) Sep. 17, 1979.

*Primary Examiner*—Ralf Dean
*Attorney, Agent, or Firm*—Anderson, Kill & Olick, P.C.

[57] ABSTRACT

A coating composition having excellent antifogging property, good abrasion resistance, improved adhesion to the substrate and good water resistance, which comprises an epoxy functional organosilane or the hydrolysate or condensate thereof; an amino functional organosilane or the hydrolysate or condensate thereof; a hydrophilic (meth) acrylate monomer, or a copolymer of two components selected from the hydrophilic (meth)acrylate monomer, another hydrophilic monomer and an organosilane and/or a terpolymer of the three components; a curing catalyst; and, optionally, a multi-functional (meth)acrylate monomer having at least two (meth)acryl groups and a radical polymerization initiator.

12 Claims, No Drawings

ANTIFOGGING ABRASION RESISTANT COATING COMPOSITION AND SYNTHETIC RESIN ARTICLE COATED THEREWITH

FIELD OF THE INVENTION

The present invention relates to an antifogging abrasion resistant coating composition and a synthetic resin article coated therewith; and, more particularly, to silicone coating composition for forming an abrasion resistant curable coating on the surface of a resin substrate to prevent fogging which may occur on the surface of the substrate, and to a synthetic resin article coated with the inventive composition.

BACKGROUND OF THE INVENTION

Optical devices, when used in such diverse applications as lenses, sunglasses, goggles, reflectors, and mirrors in automobiles, frequently suffers from the fogging or misting due to differences in the ambient temperature/humidity.

Recently, as a substitute for glass, transparent plastic materials having a superior fracture resistance have been developed and used in automobiles, other optical devices and the like. Since such plastic materials normally have a lighter weight than glass, it is particularly attractive in the field of transportation. Among these plastic materials, polycarbonate and polymethyl methacrylate are commonly employed. Particularly, polycarbonate is prefered due to its high impact strength, high heat distortion temperature, excellent dimensional stability and self-distinguishing property, in addition to the fact that it can be easily prepared. However, these plastic materials have a serious drawback in that they can be easily scratched by cleaning and weathering, which may cause deteriorate the transparancy and aesthetic appreance thereof.

Accordingly, many attempts have been made to prevent such surface fogging of these transparent plastics and simultaneously to impart the abrasion resistance property thereto. For example, Japanese Patent Nos. 69247/1978, 55044/1979, 55048/1979, 88545/1979, 88637/1979, 102831/1980 and 22341/1981 disclose processes for reducing the surface fogging of a resin substrate, which comprises applying a surfactant to the surface or compounding a surfactant with the resin during the preparation of the latter. However, these methods have the limited ability of preventing the fogging and improving the abrasion resistance.

On the other hand, Japanese Patent Nos. 69678/1980, 136848/1980, 53070/1981, 239/1986, 6064/1988 and 172778/1988, U.S. Pat. No. 4,080,476 and European Patent No. 399,441 disclose compositions comprising a hydrophilic acrylic resin, a radiation-curable (meth)acrylate and a surfactant, which are intended to provide a cured coating having an improved abrasion resistance and anti-fogging property. However, these compositions has a balancing dilemma in that when an improved abrasion resistance is obtained, the anti-fogging property becomes inferior; and vice versa.

To solve the above problem, there is disclosed a process for forming a cured coating onto a resin substrate by coating the resin substrate with a mixture of a hydrophilic resin with a silicon-containing monomer and oligomer, and then curing the coated substrate by heat or an ultraviolet light in Japanese Patent Nos. 42092/1976, 39347/1978, 195127/1982, 156553/1983, 78302/1984, 80832/1986, 44971/1986, 148535/1987, 153147/1987, 153134/1988 and 42238/1991; U.S. Pat. Nos. 4,098,840; 4,522,966 and 4,536,420; French Patent No. 2,483,448; and European Patent No. 52,427.

While, the coating obtained by the above process provides an improved abrasion resistance, but still has an inferior anti-fogging effect to that of the above acrylic resin composition. Further, when polycarbonate is employed as a substrate, the adhesion between the substrate and the cured coating is poor, which may make the coating get easily peeled off from the substrate.

Further, there have been proposed various other methods including a method of introducing water-repellency on the surface of a substrate by coating the surface with a silicone compound or a fluorocarbon compound having a lower surface tension than that of water; and a method of applying coating a silane compound onto a substrate surface in a thickness ranging from 150 to 2,000 Å and polymerizing the silane compound by a plasma treatment. However, the former renders a poor fogging resistance and the latter results in a high cost for the treatment.

SUMMARY OF THE INVENTION

Accordingly, it is an object of the present invention to provide a coating composition having an excellent anti-fogging property, good abrasion resistance, improved adhesion to a substrate and good water resistance, which comprises an epoxy functional organosilane of formula (I) or the hydrolysate or condensate thereof; an amino functional organosilane of formula (II) or the hydrolysate or condensate thereof; a hydrophilic (meth)acrylate monomer of formula (III), or a copolymer of two components selected from the hydrophilic monomer of formula (III), a hydrophilic monomer of formula (IV) and an organosilane of formula (V) and/or a terpolymer of the three components; a curing catalyst; and, optionally, a radical polymerization initiator and a multi-functional (meth)acrylate; and, a blend of two or more of the composition.

Futher, it is another object of the present invention to provide a synthetic resin article coated with the inventive composition.

In accordance with one aspect of the present invention, there is provided a coating composition comprising:

(A) up to 50% by weight of an epoxy functional organosilane of formula (I), or the hydrolysate or condensate thereof;

(B) 10 to 70% by weight of an amino functional organosilane of formula (II), or the hydrolysate or condensate thereof;

(C) 10 to 70% by weight of a hydrophilic (meth)acrylate monomer of formula (III), or a copolymer of two components selected from the hydrophilic monomer of formula (III), a hydrophilic monomer of formula (IV) and an organosilane of formula (V) and/or a terpolymer of the three components;

(D) 0.05 to 10% by weight of a curing catalyst;

(E) 0 to 20% by weight of a multi-functional (meth) acrylate; and (F) 0 to 10% by weight of a radical polymerization initiator,

-continued

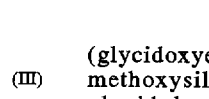  (III)

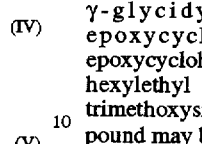  (IV)

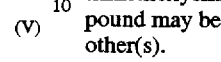  (V)

wherein:

$R^1$ represents an alkyl group having an epoxy functional group;

$R^2$ represents a hydrogen atom, or a $C_{1-6}$ hydrocarbon or vinyl group;

$R^3$ represents a hydrogen atom, or a $C_{1-5}$ hydrocarbon, $C_{1-4}$ alkoxyalkyl or acyl group;

$R^4$ represents an alkyl group having an amino funtional group;

$R^5$ represents a hydrogen atom or a methyl group;

$R^6$ represents a hydrogen atom or a $C_{1-4}$ hydrocarbon group containing a hydroxyl group;

$R^7$ represents an amine, $C_{1-4}$ alkoxy group containing an epoxy group, or $C_{1-4}$ alkyl group containing an amine group;

$R^8$ represents a $C_{1-5}$ alkyl group containing silicon;

m represents an integer of 0 to 3; and n represents an integer of 0 to 2, provided that $m+n \leq 3$.

The inventive coating composition may be a blend of two or more of the composition.

In accordance with another aspect of the present invention, there is provided a synthetic resin article having the inventive composition coated onto the surface of the resin substrate and hot-air drying the coated substrate at a temperature ranging from 90° to 150° C. for a period ranging from 10 minutes to 2 hours to form a cured film on the surface in a thickness ranging from 1 to 30 μm.

DETAILED DESCRIPTION OF THE INVENTION

The epoxy functional organosilane, which may be used as Component (A), may be preferably possessed with at least one epoxy group. Representative examples of the epoxy funtional organosilane compound may include: glycidoxymethyl trimethoxysilane, glycidoxymethyl triethoxysilane, γ-glycidoxypropyl trimethoxysilane, γ-glycidoxypropyl triethoxysilane, γ-glycidoxypropyl tri(methoxyethoxy) silane, γ-glycidoxypropyl triacetoxysilane, glycidoxymethyl dimethoxysilane, glycidoxymethyl(methyl) dimethoxysilane, glycidoxymethyl(ethyl)dimethoxysilane, glycidoxymethyl(phenyl)dimethoxysilane, glycidoxymethyl(vinyl)dimethoxysilane, glycidoxymethyl(dimethyl) methoxysilane, γ-glycidoxypropyl(methyl)dimethoxysilane, γ-glycidoxypropyl(ethyl)dimethoxysilane, γ-glycidoxypropyl(dimethyl)methoxysilane, bis-(glycidoxymethyl)dimethoxysilane, bis-(glycidoxymethyl) diethoxysilane, bis-(glycidoxyethyl)dimethoxysilane, bis-(glycidoxyethyl)diethoxysilane, bis-(glycidoxypropyl) dimethoxysilane, bis-(glycidoxypropyl)diethoxysilane, tris-(glycidoxymethyl)methoxysilane, tris-(glycidoxymethyl) ethoxysilane, tris-(glycidoxyethyl)methoxysilane, tris-(glycidoxyethyl)ethoxysilane, tris-(glycidoxypropyl) methoxysilane, tris-(glycidoxypropyl)ethoxysilane, glycidylmethyl trimethoxysilane, glycidylmethyl triethoxysilane, γ-glycidylpropyl triethoxysilane, γ-glycidylpropyl tri(methoxyethoxy)silane, γ-glycidylpropyl triacetoxysilane, 3,4-epoxycyclohexylmethyl trimethoxysilane, 3,4-epoxycyclohexylmethyl triethoxysilane, 3,4-epoxy cyclohexylethyl trimethoxysilane, 3,4-epoxycyclohexylpropyl trimethoxysilane and the like; and the organosilane compound may be employed either alone or in combination with other(s).

Preferably, the hydrolysate or condensate of the epoxy functional organosilane compound may be used and easily produced by adding water in the presence of a hydrolysis or condensation catalyst to the organosilane compound in a lower alcohol such as methanol, ethanol and isopropanol. The hydrolysate or condensate preferably has a concentration ranging from 10 to 70 wt %, more preferably 20 to 60 wt % (based on solids) and a viscosity ranging from 5 to 50 cps (centipoise) at 25° C. If the solid content is less than 10 wt %, the abrasion resistance and the anti-fogging effect becomes lowered; and, if the solid-content is greater than 70 wt %, the storage stability becomes poor.

The epoxy functional organosilane compound or the hydrolysate or condensate thereof, as Component (A), may be preferably employed in an amount of up to 50 wt % of the composition. If the amount is greater than 50 wt %, the storage stability of the composition as well as the anti-fogging effect becomes deteriorated.

Component (A) provides a cured coating having a strong abrasion resistance preferably when applied on the surface of the substrate and then dried and cured at a temperature ranging from 90° to 150° C. for a period ranging from 10 minutes to 2 hours. The epoxy group in Component (A) participates in forming a crosslinkage together with the amino functional group or hydroxyl group of the other components.

The amino functional organosilane, which may be used as Component (B), is preferably possessed with at least one amino group. Exemplary amino funtional organosilane compounds are: aminomethyl trimethoxy silane, aminoethyl trimethoxysilane, aminomethyl triethoxy silane, aminoethyl triethoxysilane, γ-aminopropyl trimethoxy silane, aminoethyl triacetoxysilane, γ-aminopropyl triethoxy silane, γ-aminopropyl methyldimethoxy silane, γ-aminopropyl methyldiethoxysilane, N-β-(aminoethyl)-γ-aminopropyl trimethoxysilane, N-β-(aminoethyl)-γ-aminopropyl triethoxy silane, δ-aminobutyl trimethoxysilane, δ-aminobutyl triethoxysilane, δ-aminobutyl methyldimethoxysilane, δ-aminobutyl methyldiethoxysilane, δ-aminobutyl phenyl dimethoxysilane, δ-aminobutyl phenyldiethoxysilane, N-(γ-acryloxy-β-hydroxypropyl)-γ-aminopropyl triethoxysilane, diethylene triaminopropyl trimethoxysilane, aminophenyl trimethoxysilane, aminophenyl triethoxysilane, γ-ureidopropyl triethoxysilane and the like; and they may be employed either alone or in combination with other(s).

The hydrolysate or condensate of the amino functional organosilane compound may be preferably used; and easily produced by adding water in the presence of a hydrolysis or condensation catalyst to the organosilane compound in a lower alcohol such as methanol, ethanol and isopropanol. The hydrolysate or condensate preferably has a concentration ranging from 10 to 60 wt %, more preferably 20 to 50 wt % (based on solids) and a viscosity ranging from 5 to 300 cps (centipoise) at 25° C. If the solid content is less than 10 wt %, the abrasion resistance and the anti-fogging effect becomes lowered; and, if the solid content is greater than 60 wt %, the storage stability and the coatability of the composition become lowered.

The amino functional organosilane compound or the hydrolysate or condensate thereof, as Component (B), may be preferably employed in an amount of ranging from 10 to 70 wt % of the composition. If the amount is less than 10 wt %, the anti-fogging effect of the finally cured coating composition becomes lowered; and, if the amount is greater than 70 wt %, the abrasion resistance of the cured coating and the coatability of the composition are poor.

In the preparation of the hydrolysate or condensate of the epoxy or amino functional organosilane, the amount of water employed may range from 0.1 to 5 moles per mole of the hydrolyzable group contained in the organosilane compound. If the amount of water employed is less than 0.1 mole, the overall conversion of the silane during the curing of the coated substrate becomes lowered; and, if the amount is greater than 5 moles, the abrasion resistance of the cured coating and the coatability of the composition are poor.

As Component (C), a hydrophilic (meth)acrylate monomer of formula (III), or a copolymer of two components selected from the hydrophilic monomer of formula (III), a hydrophilic monomer of formula (IV) and an organosilane of formula (V) and/or a terpolymer of the three components may be employed.

The hydrophilic (meth)acrylate monomer of formula (III) is preferably possessed with at least one hydrophilic group and nay be selected from the group consisting of acrylic acid, methacrylic acid, 2-hydroxyethyl acrylate, 2-hydroxypropyl acrylate, 2-hydroxyethyl methacrylate, 2-hydroxypropyl methacrylate, 3-hydroxypropyl acrylate, 3-hydroxypropyl methacrylate, hydroxyallyl methacrylate, 2-carboxylethyl acrylate, glycidyl methacrylate and the like.

Further, representative of the hydrophilic monomer of formula (IV) may include: glycidyl acrylate, glycidyl methacrylate, acrylamide, methacrylamide, N-hydroxymethyl (meth)acrylamide, N-(2-hydroxyethyl) (meth)acrylamide, N,N-dihydroxymethyl(meth)acrylamide, N,N-di(2-hydroxyethyl)(meth)acrylamide and the like.

Suitable silicon-containing compounds of formula (V) may include: N-(3-acryloxy-2-hydroxypropyl)-3-aminopropyl triethoxysilane, 3-acryloxy propyldimethylmethoxysilane, 3-acryloxy propylmethylbis (trimethylsiloxy)silane, 3-acryloxy propylmethyldichlorosilane, 3-acryloxypropyltrimethoxysilane, 3-acryloxy propyl tris (trimethylsiloxy)silane, 3-(meth)acryloxy propyltrimethoxysilane and the like.

The hydrophilic (meth)acrylate of formula (III) may be connected to a silicon network by a Michael addition reaction with the amino group of the amino functional organosilane of formula (II) or the condensate or hydrolysate thereof, as Component (B), or may form separately a polymer chain by a radical polymerization of the double bond present therein. The double bond in the (meth)acrylate participates in forming the network to thereby contribute toward the improvement of the abrasion resistance; and the hydrophilic group of the (meth)acrylate, i.e., a hydroxyl, carboxyl or glycidyl group, provides anti-fogging effect.

A copolymer of two components selected from the hydrophilic (meth)acrylate (III), a hydrophilic monomer of formula (IV) and an organosilane of formula (V), and/or a terpolymer of the three components, which may also be used as Component (C), preferably has an average molecular weight ranging from 2,000 to 100,000 and may be prepared by a conventional method.

The hydrophilic (meth) acrylate of formula (III), the copolymer and the terpolymer may be used individually or in a mixture thereof.

Component (C) may be employed in an amount ranging from 10 to 70 wt %, preferably 15 to 60 wt %, of the composition. If the amount is less than 10 wt %, the effect of reducing the fogging and improving the abrasion resistance becomes rapidly lowered; and, if the amount is greater than 70 wt %, the abrasion resistance and wettability of the cured coating become inferior.

Further, a curing catalyst as Component (D) is employed in the coating composition of the present invention, which functions to catalyze the curing process of the composition. Such curing catalyst may be an acid, base or metallic salt; and the representative compounds thereof include:

(i) an acid catalyst such as acetic acid, phosphoric acid, sulfuric acid, hydrochloric acid, nitric acid, chlorosulfonic acid, para-toluenesulfonic acid, trichloroacetic acid, polyphosphoric acid, pyrophosphoric acid, hydroiodic acid, hydroiodic anhydride, hydrobromic acid, tartaric acid, boron trifluoride, perchloric acid, periodic acid and the like;

(ii) a base catalyst such as sodium hydroxide, ammonia, potassium hydroxide, n-butylamine, di-n-butylamine, tri-n-butylamine, guanidine, biguanide, imidazole, ammonium perchlorate, triphenoxy boron, choline acetate and the like; and (iii) a metallic salt such as sodium acetate, cobalt laurate, cobalt naphthenate, zinc octylate, tin octylate, aluminum acetylacetonate, cobalt acetylacetonate, nickel acetylacetonate, zinc naphtonate, zinc boron fluoride, tin boron fluoride, tetrabutoxy titanate, tetraisopropoxy titanate, chromium acetylacetonate, titanyl acetylacetonate and the like.

The curing catalyst may be employed in an amount ranging from 0.05 to 10 wt %, preferably 0.1 to 5 wt % of the composition.

In accordance with the present invention, preferably, the epoxy functional organosilane (as Component (A)) is employed in an amount of up to 20 wt %; the amino functional organosilane (as Component (B)) is employed in an amount ranging from 15 to 70 wt %; the hydrophilic (meth)acrylate monomer, or the copolymer and/or terpolymer (as Component (C)) is employed in an amount ranging from 15 to 70 wt %; and the curing catalyst (as Component (D)) is employed in an amount ranging from 0.05 to 10% by weight of the composition.

Further, when the coating composition of the present invention employs the hydrophilic (meth)acrylate monomer of formula (III) as Component (C), the composition may comprise a multi-functional (meth)acrylate (Component (E)) having at least two (meth)acryl group in one molecule, as a crosslinking agent component, and a radical polymerization initiator (Component (F)). When only the copolymer and/or terpolymer are used as Component (C) without the acrylate monomer of formula (III), Component (E) and Component (F) are not required.

Representative of the multi-functional (meth)acrylate are: those compounds having at least three functional groups, such as pentaerithritol tetra(meth)acrylate, pentaerithritol tri(meth)acrylate, trimethylolpropane tri(meth)acrylate, trimethylolethane tri(meth)acrylate, pentaglycerol tri(meth) acrylate, dipentaerithritol tetra(meth)acrylate, dipentaerithritol penta(meth)acrylate, dipentaerithritol hexa(meth) acrylate; and di-functional (meth)acrylate compounds such as ethylene glycol di(meth)acrylate, 1,3-propylene glycol di(meth)acrylate, 1,4-butanediol di(meth)acrylate, 1,6-hexanediol di(meth)acrylate, tripropylene glycol di(meth)acrylate, ethoxylated bisphenol A di(meth)acrylate, tricyclodecane dimethanol di(meth)acrylate and the like.

The multi-functional (meth)acrylate monomer may be coupled to a silicon network by a Michael addition reaction with the amino group of the amino functional organosilane of formula (II) or the condensate or hydrolysate thereof (Component (B)), or may form an inter-crosslinked chain structure by crosslinking it with the hydrophilic (meth) acrylate (Component (C)) by a radical polymerization, to thereby impart an improved abrasion resistance to the cured coating. Particularly, the (meth)acryl group of the multi-functional (meth)acrylate monomer provides an excellent coatabilty of the composition to the polycarbonate substrate, together with the (meth)acryl group of the hydrophilic (meth)acrylate (Component (C)). Thus, when polycarbonate is employed as a substrate, it is preferred to employ the multi-functional (meth)acrylate monomer.

The multi-functional (meth)acrylate monomer, if chosen, may be employed in an amount ranging from 0.5 to 20 wt %, preferably 1 to 10 wt % of the composition. If the amount is less than 0.5 wt %, the effect of improving the abrasion resistance is very low due to the reduced level of crosslinking; and, if the amount is greater than 20 wt %, the storage stability of the composition becomes lowered due to gelation by a Michael addition reaction.

Further, the radical polymerization initiator (Component (F)), which easily generates radicals when heated, is employed to accelerate the polymerization between the hydrophilic (meth)acrylate (Component (C)) and the multi-functional (meth)acrylate monomer (Component (E)) upon curing of the composition. The radical polymerization initiator may be, for example, a ketone peroxide, diacyl peroxide, hydroperoxide, dialkyl peroxide, peroxy ketal, alkyl perester, peroxy carbonate and a water soluble peroxide.

Representative compounds of the ketone peroxide may include: ethylmethylketone peroxide, methylisobutylketone peroxide, cyclohexanone peroxide, methylcyclohexanone peroxide, 3,3,5-trimethylcyclohexanone peroxide and the like; exemplary diacyl peroxide may include: acetyl peroxide, propionyl peroxide, isobutyryl peroxide, octanoyl peroxide, 3,3,5-trimethylhexanoyl peroxide, decanoyl peroxide, rauroyl peroxide, benzoyl peroxide, para-chlorobenzoyl peroxide, 2,4-dichlorobenzoyl peroxide, acetyl cyclohexanesulfonyl peroxide and the like;and exemplary hydroperoxide may include: t-butyl hydroperoxide, cumene hydroperoxide, isopropyl benzene hydroperoxide, para-methanehydroperoxide, 2,5-dimethylhexane-2,5-dihydroperoxyhexane, 1,1,3,3-tetramethylbutyl hydroperoxide and the like.

Further, representative of the dialkyl peroxide are: di-t-butyl peroxide, t-butyl-α-cumyl peroxide, dicumene peroxide, 1,4-bis(t-butylperoxyisopropyl)benzene, 1,3-bis(t-butyl peroxyisopropyl)benzene, 2,5-dimethyl-2,5-di(t-butylperoxy)hexane and the like; exemplary peroxy ketal may include: 1,1-bisbutyl peroxy-3,3,5-trimethyl cyclohexane, n-butyl-4,4-bis(t-butylperoxy)valerate, 2,2-bis (t-butylperoxy)butane and the like.

Representative examples of the alkyl perester may include: t-butyl peroxyacetate, t-butyl peroxyisobutyrate, t-butyl peroxyoctoate, t-butyl peroxypivalate, t-butyl peroxy neodecanoate, t-butylperoxy-3,5,5-trimethylhexanoate, t-butyl peroxybenzoate, di-t-butyl peroxyphthalate, di-t-butyl peroxyisophthalate, t-butyl peroxylaurate, 2,5-dimethyl-2,5-dibenzoyl peroxyhexane and the like; and exemplary compounds of the peroxycarbonate may include: di-2-ethylhexyl peroxydicarbonate, diisopropylperoxydicarbonate, di-sec-butyl peroxydicarbonate, di-n-propyl peroxydicarbonate, dimethoxy isopropyl peroxydicarbonate, di-3-methoxybutylperoxycarbonate, di-2-ethoxyethylperoxydicarbonate, bis-(4-t-butylcyclohexyl) peroxydicarbonate, t-butyl peroxyisopropylcarbonate and the like.

The radical polymeriztion initiator, if chosen, may be employed in an amount ranging from 0.05 to 10 wt %, preferably 0.1 to 5 wt % of the composition.

Further, the composition of the present invention may comprise, optionally, a levelling agent, a slipping agent, an adhesion promoter and a polymerization inhibitor in an effective amount of, e.g., up to 10 wt %; and, an organic solvent may be added to, or removed from the composition, for the purpose of controlling the viscosity and concentration of the composition.

The abrasion resistant and anti-fogging composition of the present invention may be applied onto a suitable synthetic resin article as a substrate and then hot-air dried to remove the solvent therefrom and to cure the coating, and to thereby obtain the resin article having a cured coating. As a resin article substrate, any article molded from various thermoplastic and thermosetting resins including polymethylmethacrylate, polycarbonate, polyallyldiglycol carbonate, polystyrene, acrylonitrile-styrene copolymer, polyvinyl chloride, polyacetate, ABS (acrylonitrile-butadiene-styrene), polyester in the form of a sheet, film, rod or other shape may be employed. Particularly, the articles made from polymethylmethacrylate, polycarbonate and polyallyldiglycol carbonate resin may be preferably applied with the present composition, especially when they require enhanced optical properties, heat resistance, impact strength and abrsion resistance. The articles to be used as a substrate may be preferably pretreated by cleaning, etching, discharging with a corona discharge, irradiating with an activated energy beam, dyeing, printing and the like.

The composition may be applied by using a conventional method such as brushing, flowing, spraying, rotating or dipping depending on the characteristics and the final use of the resin article. For example, the brushing and flowing method are preferred for providing an improved abrasion resistance to a part of an article; the spraying method is preferred for coating an article having a complicated structure; the rotating method is preferred for coating an article having a smooth and symmetric structure; and the dipping method is preferred for coating an article in the form of a rod or sheet.

In accordance with the present invention, when the dipping method, which requires a sufficiently low viscosity of the composition for providing a good coatability and reproductability, is employed, the viscosity of the composition preferably ranges 100 cps (centipoise) or less at 25° C. so as to provide a coating having satisfactory surface charcteristic.

The coating composition of the present invention is preferably applied onto a resin article such that the thickness of the cured coating may be within the range of 1 to 30 μm, depending on the purpose of the final use of the article. If the thickness of the cured coating is less than 1 μm, the abrasion resistance and the anti-fogging property are inferior; and, if the thickness is greater than 30 μm, the coating becomes brittle and, therefore, the crack resistance and the strength of the article may become poor.

In accordance with the present invention, the resin article substrate thus applied is then subjected to a hot-air drying process at a temperature from 90° to 150° C. for a period from 10 minutes to 2 hours to obtain an article having a coating with good abrasion resistance and anti-fogging property effect. The air drying process may be preferably conducted at a temperature from 90° to 100° C. for a period from 10 to 20 minutes to remove the residual solvent and then at a temperature from 120° to 130° C. for a period from 20 to 40 minutes for curing.

As described above, the resin article having a cured coating in accordance with the present invention has good surface smoothness, appearance, surface strength, abrasion resistance, scratch resistance and adhesion. Further, since the coating is transparent and peel or crack resistant, it is very useful in such applications as helmet shields, lenses for wearing glasses, head lamps, sunglasses, optical devices and watches, lighting equipment covers, mirrors and the like.

The following Examples are intended to illustrate the present invention more specifically, without limiting the scope of the invention. All units, percentages, parts, etc. as used in the Examples are by weight, unless otherwise specified.

The physical properties of the articles coated with the coating compositions prepared in Examples and Comparative Examples were evaluated in accordance with the following methods.

(1) Abrasion Resistance
   (a) Surface hardness was determined in terms of pencil hardness measured in accordance with JIS K5651-1966.
   (b) Taber abrasion was determined in terms of % changes in haze of the coating, measured quantatively in accordance with ASTM D-1044 and 1003 at 100 cycles.

(2) Scratch Resistance
Scratch resistance was measured by rubbing the surface of the article with #000 steel wool in a distance of 5 cm at a loading of 10 kg, and observing the surface visually. The results are classified as follows:
   o: Not scratched
   Δ: scratched lightly
   X: scratched severely (3) Adhesion
The adhesion of the cured coating to the article was measured by using a cross cut cellotape peeling test, i.e., by pulling an adhesive tape from a 1 mm crosshatched grid of the coating over the surface area of 100 mm². This procedure was repeated three times. The results are classified as follows:
   o: Not peeled
   Δ: when 1-50 grids are peeled
   X: when 51-100 grids are peeled (4) Crack Resistance
The crack resistance was measured by a cooling-heating test, i.e., by dipping the article with a cured coating on the surface into warm water maintained at 60° C. for hour and then into iced water maintained close to 0° C. for 10 minutes, and drying the article at 80° C. This procedure was repeated five times. The results are classified as follows:
   o: Not peeled and cracked
   Δ: Cracked lightly
   X: Cracked and peeled severely (5) Anti-fogging Effect
The anti-fogging effect was measured by storing the article with a cured coating on the surface in a refrigerator at 4° C. for 60 minutes and then subjecting the cold article to saturated water vapor at 55° C. to measure the time at which the coating begins to be fogged with the vapor. This procedure was repeated five times to obtain an average time.

Preparation 1
Preparation of a copolymer solution of methacryloxypropyl trimethoxysilane and hydroxyethyl methacrylate (Copolymer(A))

Into 211 g of ethyl cellosolve were charged 13 g of methacryloxypropyl trimethoxysilane, 70 g of hydroxyethyl methacrylate and 7 g of benzoyl peroxide, and the mixture was stirred at 400 rpm to completely dissolve the benzoyl peroxide heated to 95° C. and reacted at that temperature for 5 hours to obtain a solution of a copolymer of methacryloxypropyl trimethoxysilane and hydroxyethyl methacrylate having a molecular weight of 18,000.

Preparation 2
Preparation of a copolymer solution of hydroxyethyl methacrylate and glycidyl methacrylate (Copolymer(B))

Into 307 g of ethyl cellosolve were charged 7 g of glycidyl methacrylate, 90 g of hydroxyethyl methacrylate and 4 g of azobis-isobutyronitrile, and the mixture was stirred at 400 rpm to completely dissolve the azobis-isobutyronitrile, heated to 95° C. and reacted at that temperature for 5 hours to obtain a solution of a copolymer of hydroxyethyl methacrylate and glycidyl methacrylate having a molecular weight of 22,000.

Preparation 3
Preparation of a copolymer solution of hydroxyethyl methacrylate and acrylamide (Copolymer(C))

Into 200 g of ethyl cellosolve were charged 80 g of hydroxyethyl methacrylate, 5 g of acrylamide and 5 g of azobis-isobutyronitrile, and the mixture was stirred at 450 rpm to completely dissolve the azobis-isobutyronitrile, heated to 90° C. and reacted at that temperature for 5 hours to obtain a solution of a copolymer of hydroxyethyl methacrylate and acrylamide having a molecular weight of 20,000.

Preparation 4
Preparation of a copolymer solution of glycidyl methacrylate and acrylamide (Copolymer(D))

Into 750 g of ethyl cellosolve were charged 16 g of glycidyl methacrylate, 60 g of acrylamide and 8 g of azobis-isobutyronitrile, and the mixture was stirred at 450 rpm to completely dissolve the azobis-isobutyronitrile, heated to 95° C. and reacted at that temperature for 5 hours to obtain a solution of a copolymer of glycidyl methacrylate and acrylamide having a molecular weight of 18,000.

Preparation 5
Preparation of a copolymer solution of glycidyl methacrylate and methacryloxypropyl trimethoxysilane (Copolymer (E))

Into 120 g of ethyl cellosolve were charged 40 g of glycidyl methacrylate, 7 g of methacryloxypropyl trimethoxysilane and 3 g of azobis-isobutyronitrile, and the mixture was stirred at 400 rpm to completely dissolve the azobis-isobutyronitrile, heated to 95° C. and reacted at that temperature for 5 hours to obtain a solution of a copolymer of glycidyl methacrylate and methacryloxypropyl trimethoxysilane having a molecular weight of 18,000.

Preparation 6
Preparation of a copolymer solution of acrylamide and methacryloxypropyl trimethoxysilane (Copolymer (F))

Into 180 g of ethyl cellosolve were charged 50 g of acrylamide, 18 g of methacryloxypropyl trimethoxysilane and 7 g of azobis-isobutyronitrile, and the mixture was stirred at 400 rpm to completely dissolve the azobis-isobutyronitrile, heated to 95° C. and reacted at that temperature for 5 hours to obtain a solution of a copolymer of acrylamide and methacryloxypropyl trimethoxysilane having a molecular weight of 18,000.

Preparation 7

Preparation of a terpolymer solution of glycidyl methacrylate, hydroxyethyl methacrylate and methacryloxypropyl trimethoxysilane (Terpolymer(A))

Into 200 g of ethyl cellosolve were charged 10 g of glycidyl methacrylate, 55 g of hydroxyethyl methacrylate, 17 g of methacryloxypropyl trimethoxysilane and 4 g of azobis-isobutyronitrile, and the mixture was stirred at 400 rpm to completely dissolve the azobis-isobutyronitrile, heated to 95° C. and reacted at that temperature for 5 hours to obtain a solution of a terpolymer of glycidyl methacrylate, hydroxyethyl methacrylate and methacryloxypropyl trimethoxysilane having a molecular weight of 18,000.

Preparation 8

Preparation of a terpolymer solution of acrylamide, hydroxyethyl methacrylate and methacryloxypropyl trimethoxysilane (Terpolymer (B))

Into 230 g of ethyl cellosolve were charged 4 g of acrylamide, 75 g of hydroxyethyl methacrylate, 14 g of methacryloxypropyl trimethoxysilane and 5 g of benzoyl peroxide, and the mixture was stirred at 400 rpm to completely dissolve the benzoyl peroxide, heated to 95° C. and reacted at that temperature for 5 hours to obtain a solution of a terpolymer of acrylamide, hydroxyethyl methacrylate and methacryloxypropyl trimethoxysilane having a molecular weight of 18,000.

Preparation 9

Preparation of a terpolymer solution of hydroxyethyl methacrylate, glycidyl methacrylate and acrylamide (Terpolymer(C))

Into 250 g of ethyl cellosolve were charged 80 g of hydroxyethyl methacrylate, 12 g of glycidyl methacrylate, 6 g of acrylamide and 7 g of azobis-isobutyronitrile, and the mixture was stirred at 450 rpm to completely dissolve the azobis-isobutyronitrile, heated to 95° C. and reacted at that temperature for 5 hours to obtain a solution of a terpolymer of hydroxyethyl methacrylate, glycidyl methacrylate and acrylamide having a molecular weight of 18,000.

Preparation 10

Preparation of a terpolymer solution of methacryloxypropyl trimethoxysilane, glycidyl methacrylate and acrylamide (Terpolymer (D))

Into 260 g of ethyl cellosolve were charged 20 g of methacryloxypropyl trimethoxysilane, 80 g of glycidyl methacrylate, 6 g of acrylamide and 7 g of azobis-isobutyronitrile, and the mixture was stirred at 450 rpm to completely dissolve the azobis-isobutyronitrile, heated to 95° C. and reacted at that temperature for 5 hours to obtain a solution of a terpolymer of methacryloxypropyl trimethoxysilane, glycidyl methacrylate and acrylamide having a molecular weight of 18,000.

Preparations 11 to 14

Preparation of organosilane hydrolysate/condensate solution (Silane A, B, C and D)

Into a three necked flask equipped with a stirrer and a thermometer was charged ethanol and the flask was cooled to 0° C. To the flask containing ethanol was added an organosilane monomer as specified in Table 1 below and, thereafter, 54 g of 0.1N HCl aqueous solution was added dropwise to hydrolyze all alkoxy groups in the organosilane while the reaction temperature was maintained below 10° C. After completion of the addition, the reactants were reacted at 10° C. for 5 hours and then placed in a refrigerator below 4° C. to obtain a corresponding organosilane hydrolysate/condensate solution. The amount of the organosilane employed is also represented in Table 1.

TABLE 1

| Organosilane (g) | Prep. 11 | Prep. 12 | Prep. 13 | Prep. 14 |
| --- | --- | --- | --- | --- |
| Aminopropyl triethoxysilane | 221 | — | — | — |
| N-β-(aminoethyl)-γ-aminopropyl trimethoxysilane | — | 222 | — | — |
| Diethylenetriaminopropyl trimethoxysilane | — | — | 265 | — |
| γ-glycidoxypropyl trimethoxysilane | — | — | — | 236 |
| Ethanol (g) | 181 | 324 | 424 | 356 |

EXAMPLES 1 TO 20

The copolymers and terpolymers obtained in the Preparations 1 to 10, the silane solutions obtained in the Preparations 11 to 14 and other components were employed in an amount shown in Table 2 to prepare various coating compositions of the present invention.

A plate of polycarbonate resin having a thickness of 3 mm was dipped into one of the compositions and then removed at a speed of 1 mm/sec to apply the coating composition onto the surface of the plate. The coated plate was placed in a hot-air drying oven at 90° C. for 10 minutes and cured at 130° C. for 20 minutes to cure the coating. The properties of the cured coatings were measured as described previously and the results are shown in Table 2.

Comparative Example 1

The procedures described in Examples 1 to 20 were repeated except that among the components employed in formulating the composition of Example 12, Copolymer (B) was not employed.

The properties of the cured coating were measured as described previously and the results are also shown in Table 2.

Comparative Example 2

The procedures described in Examples 1 to 20 were repeated except that among the components employed in formulating the composition of Example 12, Silane (C) was not employed.

The properties of the cured coating were measured as described previously and the results are also shown in Table 2.

Comparative Example 3

The procedures described in Examples 1 to 20 were repeated except that among the components employed in formulating the composition of Example 2, Silane (A) and Silane (B) were not employed.

The properties of the cured coating were measured as described previously and the results are also shown in Table 2.

TABLE 2

|  | Ex. 1 | Ex. 2 | Ex. 3 | Ex. 4 | Ex. 5 |
|---|---|---|---|---|---|
| COMPOSITION | | | | | |
| Copolymer(A) | 20 | — | — | — | — |
| Copolymer(B) | — | 20 | — | — | — |
| Copolymer(C) | — | — | 20 | — | — |
| Copolymer(D) | — | — | — | 20 | — |
| Copolymer(E) | — | — | — | — | 20 |
| Copolymer(F) | — | — | — | — | — |
| Terpolymer(A) | — | — | — | — | — |
| Terpolymer(B) | — | — | — | — | — |
| Terpolymer(C) | — | — | — | — | — |
| Terpolymer(D) | — | — | — | — | — |
| Silane(A) | 60 | 60 | 60 | 60 | 60 |
| Silane(B) | 60 | 60 | 60 | 60 | 60 |
| Silane(C) | — | — | — | — | — |
| Ammonium Perchlorate | 0.4 | 0.4 | 0.4 | 0.4 | 0.4 |
| Leveling Agent* | 0.04 | 0.04 | 0.04 | 0.04 | 0.04 |
| Ethel Cellosolve | 30 | 30 | 30 | 30 | 30 |
| PROPERTY | | | | | |
| Abrasion Hardness | 2H | 2H | 2H | 2H | 2H |
| Resistance Taber | 9.7 | 9.5 | 11.3 | 10.9 | 10.0 |
| Scratch Resistance | ○ | ○ | ○ | ○ | ○ |
| Adhesion | ○ | ○ | ○ | ○ | ○ |
| Crack Resistance | ○ | ○ | ○ | ○ | ○ |
| Anti-fogging Effect (min) | 2.0 | 2.3 | 1.8 | 1.5 | 1.6 |

|  | Ex. 6 | Ex. 7 | Ex. 8 | Ex. 9 | Ex. 10 |
|---|---|---|---|---|---|
| COMPOSITION | | | | | |
| Copolymer(A) | — | — | — | — | — |
| Copolymer(B) | — | — | — | — | — |
| Copolymer(C) | — | — | — | — | — |
| Copolymer(D) | — | — | — | — | — |
| Copolymer(E) | — | — | — | — | — |
| Copolymer(F) | 20 | — | — | — | — |
| Terpolymer(A) | — | 20 | — | — | — |
| Terpolymer(B) | — | — | 20 | — | — |
| Terpolymer(C) | — | — | — | 20 | — |
| Terpolymer(D) | — | — | — | — | 20 |
| Silane(A) | 60 | 60 | 60 | 60 | 60 |
| Silane(B) | 60 | 60 | 60 | 60 | 60 |
| Silane(C) | — | — | — | — | — |
| Ammonium Perchlorate | 0.4 | 0.4 | 0.4 | 0.4 | 0.4 |
| Leveling Agent* | 0.04 | 0.04 | 0.04 | 0.04 | 0.04 |
| Ethyl Cellosolve | 30 | 30 | 30 | 30 | 30 |
| PROPERTY | | | | | |
| Abrasion Hardness | 2H | 2H | 2H | 2H | 2H |
| Resistance Taber | 10.6 | 9.6 | 10.0 | 12.0 | 10.1 |
| Scratch Resistance | ○ | ○ | ○ | ○ | ○ |
| Adhesion | ○ | ○ | ○ | ○ | ○ |
| Crack Resistance | ○ | ○ | ○ | ○ | ○ |
| Anti-fogging Effect (min) | 1.6 | 2.1 | 1.9 | 2.0 | 1.6 |

|  | Ex. 11 | Ex. 12 | Ex. 13 | Ex. 14 | Ex. 15 |
|---|---|---|---|---|---|
| COMPOSITION | | | | | |
| Copolymer(A) | 20 | — | — | — | — |
| Copolymer(B) | — | 20 | — | — | — |
| Copolymer(C) | — | — | 20 | — | — |
| Copolymer(D) | — | — | — | 20 | — |
| Copolymer(E) | — | — | — | — | 20 |
| Copolymer(F) | — | — | — | — | — |
| Terpolymer(A) | — | — | — | — | — |
| Terpolymer(B) | — | — | — | — | — |
| Terpolymer(C) | — | — | — | — | — |
| Terpolymer(D) | — | — | — | — | — |
| Silane(A) | 60 | 60 | 60 | 60 | 60 |
| Silane(B) | 60 | 60 | 60 | 60 | 60 |
| Silane(C) | 5 | 5 | 5 | 5 | 5 |
| Ammonium Perchlorate | 0.4 | 0.4 | 0.4 | 0.4 | 0.4 |
| Leveling Agent* | 0.04 | 0.04 | 0.04 | 0.04 | 0.04 |
| Ethyl Cellosolve | 30 | 30 | 30 | 30 | 30 |
| PROPERTY | | | | | |
| Abrasion Hardness | 2H | 2H | 2H | 2H | 2H |
| Resistance Taber | 9.5 | 9.3 | 11.0 | 10.5 | 9.5 |
| Scratch Resistance | ○ | ○ | ○ | ○ | ○ |
| Adhesion | ○ | ○ | ○ | ○ | ○ |
| Crack Resistance | ○ | ○ | ○ | ○ | ○ |
| Anti-fogging Effect (min) | 1.9 | 2.2 | 1.7 | 1.4 | 1.5 |

|  | Ex. 16 | Ex. 17 | Ex. 18 | Ex. 19 | Ex. 20 |
|---|---|---|---|---|---|
| COMPOSITION | | | | | |
| Copolymer(A) | — | — | — | — | — |
| Copolymer(B) | — | — | — | — | — |
| Copolymer(C) | — | — | — | — | — |
| Copolymer(D) | — | — | — | — | — |
| Copolymer(E) | — | — | — | — | — |
| Copolymer(F) | 20 | — | — | — | — |
| Terpolymer(A) | — | 20 | — | — | — |
| Terpolymer(B) | — | — | 20 | — | — |
| Terpolymer(C) | — | — | — | 20 | — |
| Terpolymer(D) | — | — | — | — | 20 |
| Silane(A) | 60 | 60 | 60 | 60 | 60 |
| Silane(B) | 60 | 60 | 60 | 60 | 60 |
| Silane(C) | 5 | 5 | 5 | 5 | 5 |
| Ammonium Perchlorate | 0.4 | 0.4 | 0.4 | 0.4 | 0.4 |
| Leveling Agent* | 0.04 | 0.04 | 0.04 | 0.04 | 0.04 |
| Ethyl Cellosolve | 30 | 30 | 30 | 30 | 30 |
| PROPERTY | | | | | |
| Abrasion Hardness | 2H | 2H | 2H | 2H | 2H |
| Resistance Taber | 10.3 | 9.4 | 9.7 | 11.8 | 10.0 |
| Scratch Resistance | ○ | ○ | ○ | ○ | ○ |
| Adhesion | ○ | ○ | ○ | ○ | ○ |
| Crack Resistance | ○ | ○ | ○ | ○ | ○ |
| Anti-fogging Effect (min) | 1.5 | 2.0 | 1.8 | 1.9 | 1.5 |

|  | Comp. Ex. 1 | Comp. Ex. 2 | Comp. Ex. 3 |
|---|---|---|---|
| COMPOSITION | | | |
| Copolymer(A) | — | — | — |
| Copolymer(B) | — | 20 | 20 |
| Copolymer(C) | — | — | — |
| Copolymer(D) | — | — | — |
| Copolymer(E) | — | — | — |
| Copolymer(F) | — | — | — |
| Terpolymer(A) | — | — | — |
| Terpolymer(B) | — | — | — |
| Terpolymer(C) | — | — | — |
| Terpolymer(D) | — | — | — |
| Silane(A) | 60 | 60 | — |
| Silane(B) | 60 | 60 | — |
| Silane(C) | 5 | — | 5 |
| Ammonium Perchlorate | 0.4 | 0.4 | 0.1 |
| Leveling Agent* | 0.04 | 0.04 | 0.01 |
| Ethyl Cellosolve | 30 | 30 | 10 |
| PROPERTY | | | |
| Abrasion Hardness | 2H | H | H |
| Resistance Taber | 13.4 | 19.2 | 22.3 |
| Scratch Resistance | ○ | Δ | Δ |
| Adhesion | Δ | Δ | X |
| Crack Resistance | Δ | Δ | Δ |
| Anti-fogging Effect (min) | 1.9 | 1.5 | 0.5 |

*Leveling agent: A fluorinated alkyl alkoxylate, a product of 3M.
*The amount of the components used in the composition is in g unit.

EXAMPLES 21 TO 23

The silane solutions obtained in the Preparations 11 to 14 and other components were employed in an amount shown in Table 3 to prepare various coating compositions of the present invention.

A plate of polycarbonate resin having a thickness of 3 mm was dipped into one of the compositions and then removed at a speed of 1 mm/sec to coat the coating composition onto the surface of the plate. The coated plate was placed in a hot-air drying oven at 90° C. for 10 minutes and cured at 130° C. for 20 minutes to cure the coating. The properties of the cured coatings were measured as described previously and the results are shown in Table 3.

EXAMPLE 24

The procedures described in Examples 21 to 23 were repeated except that among the components employed in formulating the composition of Example 21, Silane (D) was not employed and therefor Silane (A) was employed in an amount of 77 parts by weight.

The properties of the cured coating were measured as described previously and the results are also shown in Table 3.

Comparative Example 4

The procedures described in Examples 21 to 23 were repeated except that among the components employed in formulating the composition of Example 21, Silane (A) was not employed and therefor Silane (D) was employed in an amount of 77 parts by weight.

The properties of the cured coating were measured as described previously and the results are also shown in Table 3.

Comparative Example 5

The procedures described in Examples 21 to 23 were repeated except that among the components employed in formulating the composition of Example 21, 2- hydroxypropyl methacrylate as a hydrophilic acrylate monomer was not employed and in its instead Silane (A) was employed in an amount of 87 parts by weight.

The properties of the cured coating were measured as described previously and the results are also shown in Table 3.

Comparative Example 6

The procedures described in Examples 21 to 23 were repeated except that among the components employed in formulating the composition of Example 21, 2- hydroxypropyl methacrylate as a hydrophilic acrylate monomer was employed in an amount of 23 parts by weight.

The properties of the cured coating were measured as described previously and the results are also shown in Table 3.

TABLE 3

|  | Ex. 21 | Ex. 22 | Ex. 23 | Ex. 24 |
| --- | --- | --- | --- | --- |
| COMPOSITION |  |  |  |  |
| Silane(A) | 67 | — | — | 77 |
| Silane(B) | — | 67 | — | — |
| Silane(C) | — | — | 67 | — |
| Silane(D) | 10 | 10 | 10 | — |
| 2-HPMA | 20 | 20 | 20 | 20 |
| HDDA | 3 | 3 | 3 | 3 |
| Aluminum | 0.23 | 0.23 | 0.23 | 0.23 |
| acetylacetonate |  |  |  |  |
| BPO | 0.23 | 0.23 | 0.23 | 0.23 |
| Leveling Agent | 0.046 | 0.046 | 0.046 | 0.046 |
| Ethyl Cellosolve | 30 | 30 | 30 | 30 |
| PROPERTY |  |  |  |  |
| Abrasion Hardness | 2H | 2H | 2H | 2H |
| Resistance Taber | 11.7 | 10.4 | 9.3 | 13.5 |
| Scratch Resistance | O | O | O | O |
| Adhesion | O | O | O | O |
| Crack Resistance | O | O | O | O |
| Anti-fogging Effect (min) | 2.0 | 2.2 | 2.5 | 2.4 |

|  | Comp. Ex. 4 | Comp. Ex. 5 | Comp. EX. 6 |
| --- | --- | --- | --- |
| COMPOSITION |  |  |  |
| Silane(A) | — | 87 | 67 |
| Silane(B) | — | — | — |
| Silane(C) | — | — | — |
| Silane(D) | 77 | 10 | 10 |
| 2-HPMA | 20 | — | 23 |
| HDDA | 3 | 3 | — |
| Aluminum | 0.23 | 0.23 | 0.23 |
| acetylacetonate |  |  |  |
| BPO | 0.23 | 0.23 | 0.23 |
| Leveling Agent | 0.046 | 0.046 | 0.046 |
| Ethyl Cellosolve | 30 | 30 | 30 |
| PROPERTY |  |  |  |
| Abrasion Hardness | H | 2H | H |
| Resistance Taber | 21.5 | 8.7 | 19.5 |
| Scratch Resistance | Δ | O | Δ |
| Adhesion | X | Δ | O |
| Crack Resistance | Δ | Δ | O |
| Anti-fogging Effect (min) | 0.5 | 2.0 | 2.5 |

*2-HPMA: 2-hydroxypropyl methactylate
HDDA: Hexanediol diacrylate
BPO: Benzoyl peroxide
*The amount of the components used in the composition is in g unit.

EXAMPLES 25

The procedures described in Examples 21 to 24 were repeated except that a blend of the composition obtained in Example 2 with the composition obtained in Example 23 in a ratio of 1:2 was employed.

The properties of the cured coating were measured as described previously and the results are shown in Table 4.

TABLE 4

| Abrasion Resistance | Hardness Taber | 3H 3.7 |
| --- | --- | --- |
| Scratch Resistance |  | 0 |
| Adhesion |  | 0 |
| Crack Resistance |  | 0 |
| Anti-fogging Effect(min) |  | 3.0 |

As can be seen from the above Tables 2, 3 and 4, the synthetic resin articles coated with the compositions of the present invention have excellent abrasion resistance, scratch resistance, adhesion, crack resistance and anti-fogging property.

While the invention has been described in connection with the specific embodiments contained herein, it should be recognized that various modifications and changes may be made and also fall within the scope of the invention as defined by the claims that follow.

What is claimed is:

1. A coating composition comprising:
   (A) 10 to 70% by weight of an amino functional organosilane compound of formula (II), or the hydrolysate or condensate thereof;
   (B) 10 to 70% by weight of a copolymer of two components selected from a hydrophilic hydroxy(meth)acrylate monomer of formula (III), an epoxy or amino group-containing hydrophilic monomer of formula (IV) and an organosilane of formula (V) and/or a terpolymer of the three components; and
   (C) 0.05 to 10% by weight of a curing catalyst:

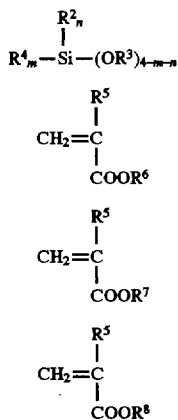

wherein:
   $R^2$ represents a hydrogen atom, or a $C_{1-6}$ alkyl or vinyl group;
   $R^3$ represents a $C_{1-5}$ alkyl, $C_{1-4}$ alkoxyalkyl or acyl group;
   $R^4$ represents an alkyl group having an amino functional group;
   $R^5$ represents a hydrogen atom or a methyl group;
   $R^6$ represents a hydrogen atom or a $C_{1-4}$ alkyl group containing a hydroxyl group;
   $R^7$ represents an amine, $C_{1-4}$ alkoxy group containing an epoxy group, or $C_{1-4}$ alkyl group containing an amine group;
   $R^8$ represents a $C_{1-5}$ alkyl group containing silicon;
   m represents an integer of 0 to 3; and
   n represents an integer of 0 to 2, provided that $m+n \leq 3$.

2. The composition of claim 1 wherein the amino functional organosilane compound is selected from the group consisting of aminomethyl trimethoxy silane, aminoethyl trimethoxysilane, aminomethyl triethoxy silane, aminomethyl triethoxysilane, γ-aminopropyl trimethoxy silane, aminoethyl triacetoxysilane, γ-aminopropyl triethoxy silane, γ-aminopropyl methyldimethoxysilane, γ-aminopropyl methyldiethoxysilane, N-β-(aminoethyl)-γ-aminopropyl trimethoxysilane, N-β-(aminoethyl)-γ-aminopropyl triethoxy silane, δ-aminobutyl trimethoxysilane, δ-aminobutyl triethoxysilane, δ-aminobutyl methyldimethoxysilane, δ-aminobutyl methyldiethoxysilane, δ-aminobutyl phenyl dimethoxysilane, δ-aminobutyl phenyldiethoxysilane, N-(γ-acryloxy-β-hydroxypropyl)-γ-aminopropyl triethoxysilane, diethylene triaminopropyl trimethoxysilane, aminophenyl trimethoxysilane, aminophenyl triethoxysilane and γ-ureidopropyl triethoxysilane.

3. The composition of claim 1 wherein the curing catalyst is an acid selected from the group consisting of acetic acid, phosphoric acid, sulfuric acid, hydrochloric acid, nitric acid, chlorosulfonic acid, para-toluenesulfonic acid, trichloroacetic acid, polyphosphoric acid, pyrophosphoric acid, hydroiodic acid, hydroiodic anhydride, hydrobromic acid, tartaric acid, boron trifluoride, perchloric acid and periodic acid.

4. The composition of claim 1 wherein the curing catalyst is a base selected from the group consisting of sodium hydroxide, ammonia, potassium hydroxide, n-butylamine, di-n-butylamine, tri-n-butylamine, guanidine, biguanide, imidazole, ammonium perchlorate, triphenoxy boron and choline acetate.

5. The composition of claim 1 wherein the curing catalyst is a metallic salt selected from the group consisting of sodium acetate, cobalt laurate, cobalt naphthenate, zinc octylate, tin octylate, aluminum acetylacetonate, cobalt acetylacetonate, nickel acetylacetonate, zinc naphtonate, zinc boron fluoride, tin boron fluoride, tetrabutoxy titanate, tetraisopropoxy titanate, chromium acetylacetonate and titanyl acetylacetonate.

6. The composition of claim 1 wherein the amino functional organosilane as component (B) is employed in an amount ranging from 15 to 70% by weight; the hydrophilic (meth)acrylate monomer, or the copolymer and/or the terpolymer as component (C) is employed in an amount ranging from 15 to 70% by weight; and the curing catalyst as Component (D) is employed in an amount ranging from 0.05 to 10% by weight of the composition.

7. A coating composition comprising:
   (A) 0.001 to 50% by weight of an epoxy functional organosilane of formula (I), or the hydrolysate or condensate thereof;
   (B) 10 to 70% by weight of an amino functional organosilane of formula (II), or the hydrolysate or condensate thereof;
   (C) 10 to 70% by weight of a hydrophilic hydroxy(meth)acrylate monomer of formula (III);
   (D) 0.5 to 20% by weight of a multi-functional (meth)acrylate having at least two (meth)acryl groups in the molecule;
   (E) 0.05 to 10% by weight of a radical polymerization initiator; and
   (F) 0.05 to 10% by weight of a curing catalyst:

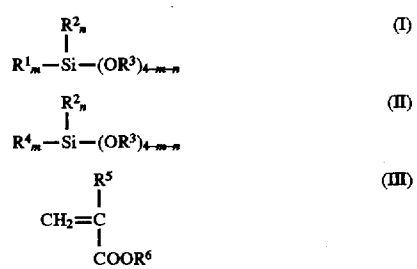

$R^1$ represents an alkyl group having an epoxy functional group;
$R^2$ represents a hydrogen atom or an $C_{1-4}$ alkyl group or a vinyl group;
$R^3$ represents a $C_{1-5}$ alkyl, $C_{1-4}$ alkoxyalkyl or acyl;
$R^4$ represents an alkyl group having an amino functional group
$R^5$ represents a hydrogen atom or a methyl group;
$R^6$ represents a hydrogen atom or a $C_{1-4}$ alkyl group containing a hydroxy group;
m represents an integer of 0 to 3; and
n represents and integer of 0 to 2, provided that $m+n \leq 3$.

8. The composition of claim 7 wherein the epoxy functional organosilane is selected from the group consisting of glycidoxymethyl trimethoxysilane, glycidoxymethyl triethoxysilane, γ-glycidoxypropyl trimethoxysilane, γ-glycidoxypropyl triethoxysilane, γ-glycidoxypropyl tri(methoxyethoxy)silane, γ-glycidoxypropyl triacetoxysilane, glycidoxymethyl dimethoxysilane, glycidoxymethyl(methyl)dimethoxysilane, glycidoxymethyl(ethyl)dimethoxysilane, glycidoxymethyl(phenyl)dimethoxysilane, glycidoxymethyl(vinyl)dimethoxysilane, glycidoxymethyl(dimethyl)methoxysilane, γ-glycidoxypropyl(methyl)dimethoxysilane, γ-glycidoxypropyl(ethyl)dimethoxysilane, γ-glycidoxypropyl(dimethyl)methoxysilane, bis-(glycidoxymethyl)dimethoxysilane, bis-(glycidoxymethyl)diethoxysilane, bis-(glycidoxyethyl)dimethoxysilane, bis-(glycidoxyethyl)diethoxysilane, bis-(glycidoxypropyl)dimethoxysilane, bis-(glycidoxypropyl)diethoxysilane, tris-(glycidoxymethyl)methoxysilane, tris-(glycidoxymethyl)ethoxysilane, tris-(glycidoxyethyl)methoxysilane, tris-(glycidoxyethyl)ethoxysilane, tris-(glycidoxypropyl)methoxysilane, tris-(glycidoxypropyl)ethoxysilane, glycidylmethyl trimethoxysilane, glycidylmethyl triethoxysilane, γ-glycidylpropyltriethoxysilane, γ-glycidylpropyl tri(methoxyethoxy)silane, γ-glycidylpropyl triacetoxysilane, 3,4-epoxycyclohexylmethyl trimethoxysilane, 3,4-epoxycyclohexylmethyl triethoxysilane, 3,4-epoxy cyclohexylethyl trimethoxysilane and 3,4-epoxycyclohexylpropyl trimethoxysilane and a mixture thereof.

9. The composition of claim 7 wherein the epoxy functional organosilane is employed in an amount of 0.01 to 20% by weight.

10. The composition of claim 8 wherein the multifunctional (meth)acrylate is selected from the group consisting of pentaerithritol tetra(meth)acrylate, pentaerithritol tri(meth)acrylate, trimethylolpropane tri(meth)acrylate, trimethylolethane tri(meth)acrylate, pentaglycerol tri(meth)acrylate, dipentaerithritol tetra(meth)acrylate, dipentaerithritol penta(meth)acrylate, dipentaerithritol hexa(meth)acrylate, ethylene glycol di(meth)acrylate, 1,3-propylene glycol di(meth)acrylate, 1,4-butanediol di(meth)acrylate, 1,6-hexanediol di(meth)acrylate, tripropylene glycol di(meth)acrylate, ethoxylated bisphenol A di(meth)acrylate and tricyclodecane dimethanol di(meth)acrylate.

11. The composition of claim 7 wherein the radical polymerization initiator is selected from the group consisting of ketone peroxides, diacyl peroxides, hydroperoxides, dialkyl peroxides, peroxy ketals, alkyl peresters, peroxy carbonates and water soluble peroxides.

12. A coating composition produced by blending the composition of claim 1 with the composition of claim 6.

* * * * *